(No Model.)

L. W. SCHAUFUSS.
WEATHER VANE.

No. 375,201. Patented Dec. 20, 1887.

Witnesses:
O. Barritt
F. W. Rubien

Inventor:
Ludwig Wilhelm Schaufuss
Per Singerbien
Attorneys.

UNITED STATES PATENT OFFICE.

LUDWIG WILHELM SCHAUFUSS, OF DRESDEN, SAXONY, GERMANY.

WEATHER-VANE.

SPECIFICATION forming part of Letters Patent No. 375,201, dated December 20, 1887.

Application filed March 26, 1887. Serial No. 232,540. (No model.)

*To all whom it may concern:*

Be it known that I, LUDWIG WILHELM SCHAUFUSS, a subject of the Emperor of Germany, residing in the city of Dresden, Kingdom of Saxony, have invented a new and useful Improvement in Weather-Vanes, of which the following is a clear and exact description of the same, reference being had to the accompanying drawings, forming a part of this specification.

This invention relates to vanes and wind-indicators, the object being to render them sensitive to the least swaying of the wind force, which object I attain by constructing an apparatus illustrated in the following drawings, in which—

Figure 1:
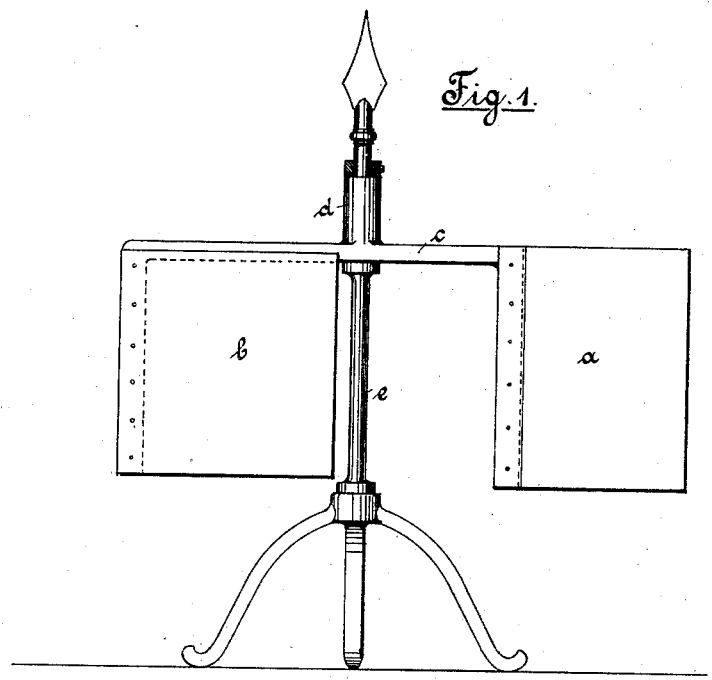
Figure 2:
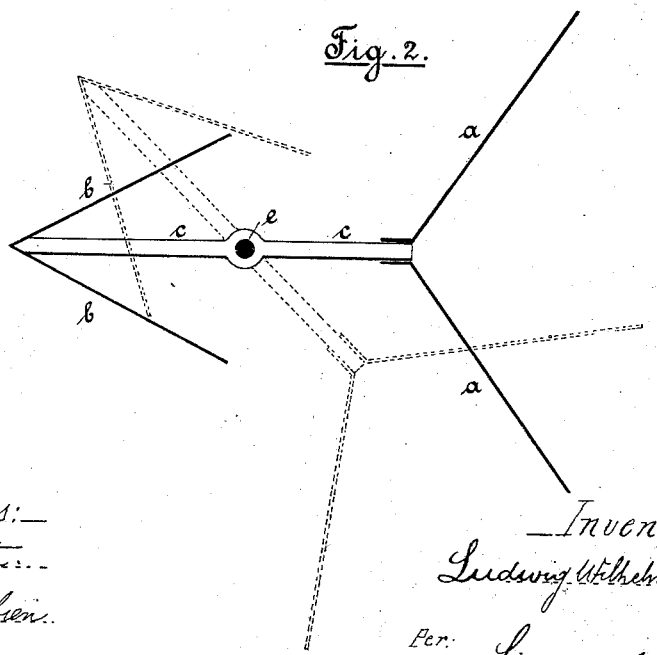

Figure 1 is an elevation view of my invention. Fig. 2 is a plan view of the same.

The invention, then, as seen, consists simply of two pairs of wings arranged upon a common axle, each pair being put together at a different angle. Thus while the larger pair of wings, $a$ $a$, constitutes an obtuse angle, the smaller pair, $b$ $b$, forms an acute one. Both are connected together by rod $c$, which, by means of box $d$, rotates upon tripod $e$. In consequence of the different size of their angles the wind strikes with different force each pair of the wings, and as the wind impinges upon each pair at the point as well as at the end of the rod $c$, being thus compelled to sweep over four surfaces, it necessarily follows that the least swaying and the smallest change in the direction of the wind find adequate expression.

Having now described my invention, I desire to claim—

In a weather-vane, the combination of two pairs of fans, each of different angle, whereby four inclined surfaces are exposed to the varying force of the wind, with the rod to which said fans are attached, and means for supporting the same, substantially as described.

In witness whereof I have hereunto signed my name in the presence of two subscribing witnesses.

LUDWIG WILHELM SCHAUFUSS.

Witnesses:
EMIL DOMSCH,
OTTO WOLFF.